Sept. 12, 1967   C. E. BISHOP ET AL   3,340,571
SPINNERET FOR MAKING HOLLOW FILAMENTS
Original Filed April 2, 1964   2 Sheets-Sheet 1
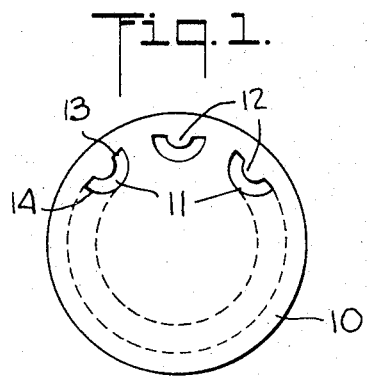
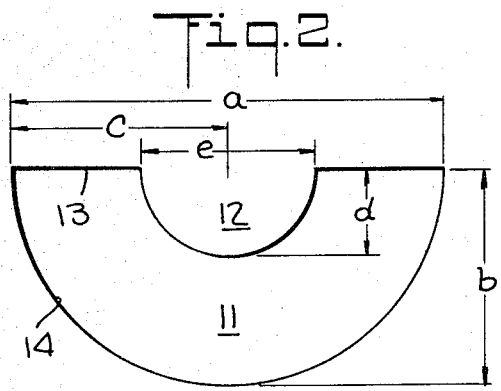
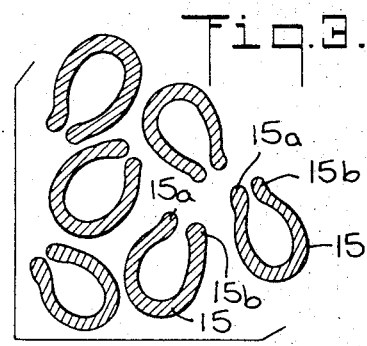
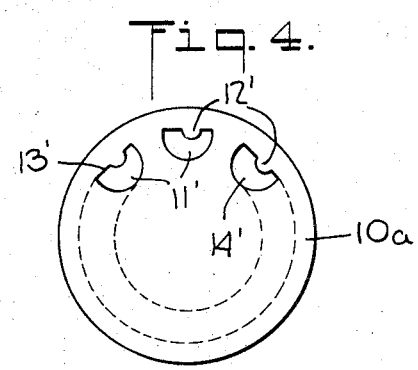
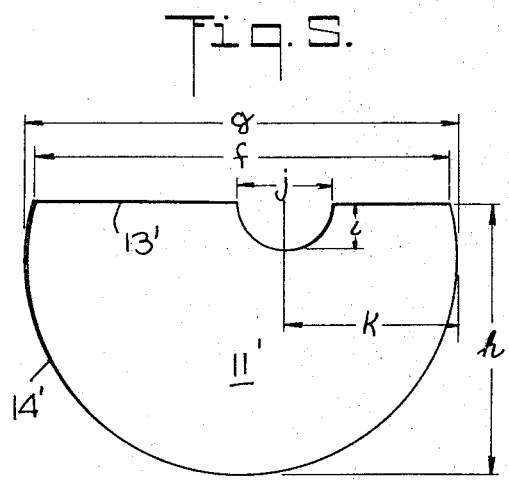
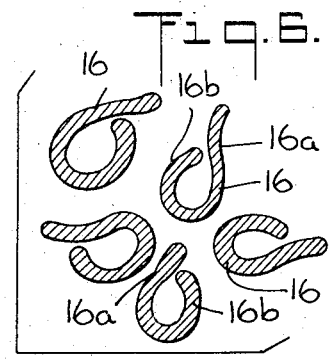
INVENTORS
CLARENCE E. BISHOP
PAUL H. YOUNG
BY Herbert L. Gatewood
ATTORNEY

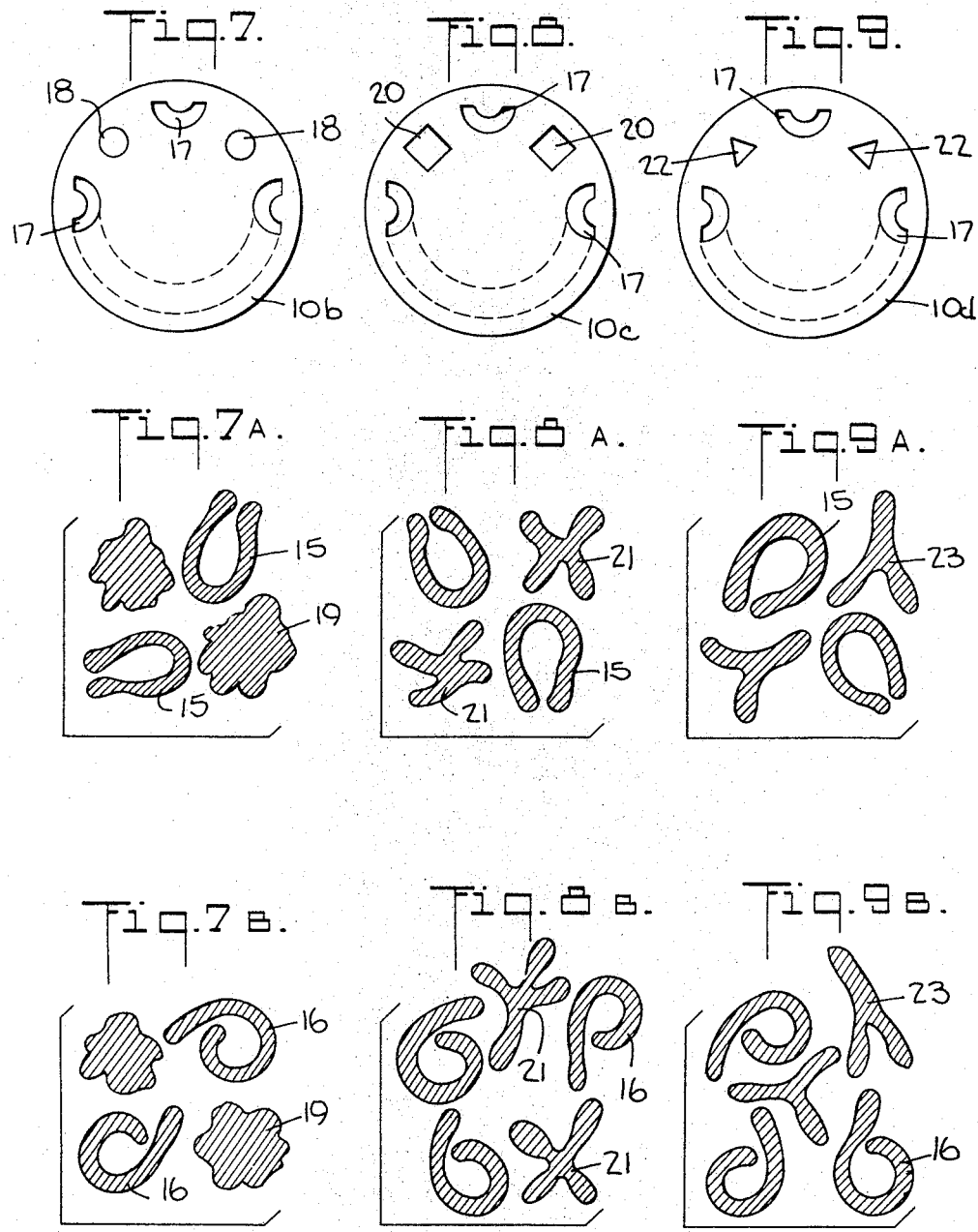

United States Patent Office 3,340,571
Patented Sept. 12, 1967

3,340,571
SPINNERET FOR MAKING HOLLOW FILAMENTS
Clarence Edward Bishop and Paul Harold Young, Narrows, Va., assignors to Celanese Corporation of America, New York, N.Y., a corporation of Delaware
Original application Apr. 2, 1964, Ser. No. 356,725. Divided and this application Sept. 27, 1965, Ser. No. 511,003
12 Claims. (Cl. 18—8)

This application is a division of S.N. 356,725, filed Apr. 2, 1964, and now abandoned.

An object of the invention is to provide novel spinnerettes for use in a dry spinning system, the spinnerettes having jet openings or extrusion orifices of novel configuration formed therein to enable the production of filamentary material of the aforesaid types.

The foregoing and other objects, characteristics and advantages of the present invention will be more fully understood from the following detailed description thereof when read in conjunction with the accompanying drawings, in which:

FIG. 1 is a plan view of a spinnerette constructed with a plurality of jet openings or orifices specially shaped according to one embodiment of the present invention;

FIG. 2 is an enlarged diagrammatic representation of such a jet opening and illustrates the various dimensional characteristics and relationships thereof;

FIG. 3 is a cross-sectional view, on an enlarged scale, of the filamentary material produced by the spinnerette shown in FIG. 1;

FIG. 4 is a plan view of a spinnerette constructed with a plurality of jet openings specially shaped according to another embodiment of the present invention;

FIG. 5 is an enlarged diagrammatic representation of a jet opening of the type shown in FIG. 4 and illustrates the various dimensional characteristics and relationships thereof;

FIG. 6 is a cross-sectional view, on an enlarged scale, of the filamentary material produced by the spinnerette shown in FIG. 4;

FIGS. 7, 8 and 9 are plan views of spinnerettes having jet openings or orifices of the type shown in FIG. 1 alternating with respective sets of differently shaped openings according to still other embodiments of the present invention;

FIGS. 7a, 8a and 9a are cross-sectional views, on an enlarged scale, of the filamentary materials produced by the spinnerettes shown in FIGS. 7, 8 and 9, respectively; and FIGS. 7b, 8b and 9b are cross-sectional views, on an enlarged scale, of the respective filamentary materials produced by spinnerettes in which orifices or jet openings of the type shown in FIG. 4 alternate with respective sets of differently shaped openings.

In accordance with the invention generally, filament-forming material in liquid phase, e.g. a solution in a volatile solvent, is dry spun by extrusion through the openings or orifices of a spinnerette into an evaporative atmosphere or heated air. A dry spinning system for converting derivatives of cellulose, more particularly a cellulose organic acid ester solution such as cellulose acetate in a volatile solvent, into filaments, yarn or tow is well known and need not be illustrated or described in detail herein. There are provided according to the present invention, however, novel spinnerettes for use in such a system.

The spinnerette according to one aspect of the invention is provided with a plurality of openings each of which has the shape of a segment of a circle the straight boundary wall of which (constituted by the respective chord or diameter of the circle) is provided with an either centrally or eccentrically located protuberance extending toward the curved wall of the opening. In accordance with various embodiments of the invention, in any given spinnerette the so-modified segmental openings are arranged in alternating relationship with circular openings, or with square openings, or with triangular openings.

Filamentary materials in accordance with the present invention may comprise organic derivatives of cellulose such as the esters or ethers thereof, for example cellulose organic acid esters such as cellulose acetate, cellulose propionate, cellulose butyrate, cellulose benzoate, cellulose acetate formate, cellulose acetate propionate, cellulose acetate butyrate, and the like, ethers such as ethyl cellulose, etc. The esters may be ripened and acetone-soluble, such as conventional cellulose acetate, or may be substantially fully esterified, that is, contain fewer than 0.29 free hydroxyl groups per anhydroglucose unit, e.g. cellulose triacetate.

The filament-forming material may also comprise a variety of other thermoplastic or solvent-soluble polymeric materials such as super-polyamides, e.g. nylon, superpolyesters such as polyethylene terephthalate, polyglycolic acid and copolymers thereof, acrylonitrile polymers and copolymers, polymers and copolymers of olefins and vinyl esters such as ethylene, propylene, vinyl chloride, vinyl acetate, vinylidene chloride, vinylidene cyanide, and the like.

The filament-forming material is initially in liquid phase. In operation, a solution of the filament-forming material in a volatile solvent is extruded through the jet openings of a spinnerette into an evaporative atmosphere. The filaments formed upon extrusion of the solution are taken up at a linear speed ranging from about 40 meters per minute to about 700 meters per minute and preferably from about 55 meters per minute to about 600 meters per minute. The take-up speed may range from about 0.6 to about 1.7 times the linear speed at which the solution is extruded through the jet openings, and preferably ranges from about 0.9 to about 1.3 times this linear speed. When dry spinning a solution of secondary cellulose acetate in acetone, the temperature of the dope being extruded generally ranges from about 40° C. to about 110° C.

In forming filaments in accordance with the present invention, each spinnerette may be provided with as few as 15 or less and with as many as 500 or more openings or orifices. The denier per filament may be as high as 55 or more but generally ranges from about 2 to about 25 and preferably from about 3 to 20. Large bundles or tows of filaments can be formed directly from the spun filaments or alternatively by combining several smaller bundles, such large bundles being especially useful for forming cigarette filters, for the formation of staple fibers by cutting, etc. Prior to such further processing, a bundle of filaments may be subjected to any desired treatment to increase its bulk, as by air or steam jet bulking or by crimping, e.g. to impart about 5 to 20 and preferably about 7 to 12 crimps per inch.

Referring now to the drawings in greater detail, it will be seen that the spinnerettes 10 and 10a (FIGS. 1 and 4) according to the present invention are provided with respective sets of jet openings 11 and 11' each of which basically has the shape of a segment of a circle. The openings are, however, somewhat modified from being full segments of respective circles. Thus, the straight boundary wall of each opening 11 is provided intermediate its ends with a centrally or symmetrically disposed protuberance 12 extending from the said straight wall toward the opposed curved boundary wall of the same opening. The straight boundary wall of each openng 11' is on the other hand provided with an eccentrically or asymmetrically located small protuberance 12'. In essence, therefore, it may be said (always keeping in mind the intangible nature of an opening as such) that the openings 11 and 11' are inwardly indented or notched along their straight sides, and the terms "notch" and "indentation" will be employed hereinafter to designate the portions of these openings missing due to the presence of the protuberances 12 and 12'.

Although in FIGS. 1 and 4 the curved walls of the openings 11 and 11' are shown as being located inwardly of the spinnerettes 10 and 10a relative to the respective straight walls which, conversely, are shown as being located outwardly of the spinnerettes, while at the same time the said straight walls are shown as essentially aligned with one another longitudinally, i.e. they are all tangent to respective common circles concentric with the outer peripheries of the spinnerettes, it will be understood that this arrangement is susceptible to variation so as to produce other relative orientations of the respective sets of openings. Also, since the number of jet openings may be quite high, it will be apparent that the locus of all the openings in any given spinnerette need not be one circle, as illustrated in FIGS. 1 and 4. Rather, the jet openings may be arranged in a plurality of concentric circles or in straight rows or tiers.

In accordance with one aspect of the present invention, each of the segmental openings 11 is defined between the arc of a semicircle and the diameter of the same circle, while each of the openings 11' is defined between a greater than 180° arc of a circle and a chord of the same circle, the overall area of the segment in each case being reduced, of course, by the area of the associated indentation or notch 12 or 12'. Thus, referring first to FIG. 2, the maximum width of the opening 11, i.e. the length $a$ of the straight line boundary 13, is equal to the diameter of the completed or circumscribed circle of which the curved line boundary 14 forms a part, and the maximum depth $b$ of the opening 11 measured perpendicularly from the straight line boundary 13 to the apex of the curved line boundary 14 is equal to one half of $a$, i.e. the radius of the same circle. In this form of the opening, the notch or indentation 12 is illustrated as being located centrally of the straight line boundary 13, i.e. the distance $c$ from the bisector of the notch to either end of the line 13 is equal to the radius of the circle. Concurrently, the maximum depth $d$ of the notch or indentation 12 may range from about 15% to about 50% of the orifice depth $b$, while the base length $e$ of the notch or indentation may range from about 25% to about 50% of the length $a$ of the line 13. In general, the diameter $a$ of the opening 11 ranges from about 38 to about 280 microns, and preferably is between about 65 and 185 microns, whereby the overall area of the opening ranges from about 500 to about 27,500 square microns, i.e. from about 35% to about 50% of the area of a full circle of the same diameter, and preferably is between about 1500 and 12,500 square microns, i.e. between about 40% and 50% of the full circle area.

On the other hand, the curved line boundary 14' (see FIG. 5) of the opening 11' extends over more than a 180° arc of a circle, so that the length $f$ of the straight line boundary 13' of this opening is now less than the maximum width $g$ (the diameter) of the said circle of which the curved line forms a part. Concurrently, the maximum depth $h$ of the opening 11' is from about 25% to about 50% greater than the radius ($g/2$) of the circle. The maximum depth $i$ of the notch or indentation 12' may range from about 10% to about 30% of the orifice depth $h$, while the base length $j$ of the notch or indentation may range from about 5% to about 20% of the length $f$ of the line 13'. In this form of the opening or orifice, the notch or indentation is illustrated as being located eccentrically of the straight line boundary 13'. The distance $k$ from the bisector of the notch to the nearer end of the line 13' thus ranges from about 70% to about 90% of the radius of the circle. In general, the diameter $g$ of the opening 11' ranges from about 38 to about 280 microns, and preferably is between about 65 and 185 microns, whereby the overall area of the opening ranges from about 675 to about 36,500 square microns, i.e. from about 50% to about 70% of the area of a full circle of the same diameter, and preferably is between about 2000 and 12,000 square microns, i.e. between about 55% and 65% of the full circumscribed circle area.

The filaments produced by extrusion of the filament-forming material through the spinnerettes 10 and 10a have cross-sectional shapes substantially different from the shapes of the respective jet openings 11 and 11'. Thus, the filaments 15 (see FIG. 3) resulting from extrusion through the spinnerette 10 of FIG. 1 are seen to have essentially the configuration (in cross-section) of a U or vertically flattened C the opposite ends 15a and 15b of which are generally disposed one next to the other and only very slightly out of contact, i.e. the arms of the U are substantially of equal length. Moreover, the filament cross-sections have relatively uniform wall thicknesses and are relatively symmetrical about their longitudinal center lines.

By way of contradistinction, the filaments 16 (see FIG. 6) produced by extrusion of the filament-forming material through the spinnerette 10a of FIG. 4 have cross-sectional shapes which are relatively non-symmetrical in all directions and resemble the Greek letter "sigma." Thus, each filament 16 has a relatively longer and straight arm 16a and a relatively shorter and curved arm 16b, the terminal end of the latter being located in close proximity to, i.e. either just in or just out of contact with, an intermediate point of the longer arm 16a. Alternatively stated, the filaments 16 appear to have an almost circular hollow configuration with a tail extending tangentially from the periphery of the body of each filament, somewhat in the manner of a snail. As in the case of the U filaments 15, the wall thickness of the "sigma" filaments 16 is relatively uniform.

It should be understood, of course, that within the purview of the present invention the area of each jet opening 11 may exceed somewhat the area of one half of the circumscribed circle, while the area of each jet opening 11' may be somewhat less than the area of one half of the circumscribed circle. Such variations from the preferred jet opening characteristics outlined hereinbefore will not lead to changes in the basic cross-sectional shapes of the filaments, since the factor of percentage of the area of the circumscribed circle affects only the degree of closure of the cross-sectional shape, while the factor of eccentricity (or lack of eccentricity) of the notch predetermined only the degree of unbalance (or balance) of the cross-sectional shape.

Yarns including filaments dry spun with the aid of the spinnerettes 10 and 10a according to the present invention are particularly useful for the manufacture of a great variety of both textile and non-textile end products. Merely by way of example, these yarns are, by virtue of their high covering power and bulk, well suited for use in carpeting and upholstery fabrics. The greatly improved dyeability characteristics of such yarns and their resistance to streaking as well as their relatively smooth "hand" or feel also make them well suited for use in such fabrics as taffetas and antique satins. The yarns may be crimped, or air or steam jet bulked, or they may be cut into staple, preferably following crimping. Moreover, the cross-sectional periphery, and hence the filament surface area, for either of these novel types of filaments is about 5% to about 20% greater than that of filaments of equal denier spun through circular openings. As a result, the filaments provide relatively great filtering surfaces when used in cigarette filters or in other gas and liquid filter media.

More particularly, with reference to the manufacture of cigarette filters or filter plugs, one of the main objects constantly sought to be attained is the reduction of the effort required to draw smoke through the filter. Tows presently used for this purpose are basically characterized by a relatively high pressure drop, i.e. the effort to draw smoke through filters made of such tows is relatively great.

The pressure drop across a cigarette filter plug is effectively the result of a number of different factors. First among these is the resistance which the plug offers to the air flow therethrough as a function of the interlocking action of the individual filaments, it being understood that the interlocking action determines the actual path of the air, either straight or tortuous, through the plug.

The second factor is the bulkiness of the tow which determines the weight of tow that must be used to provide a firm filter plug. The weight of the tow determines the number of filaments present in the plug and hence the number of collisions which an air molecule has with filaments in passing through the plug, this number in turn determining the pressure differential needed to draw air through at a predetermined rate.

A third factor is the type of and density of application of the plasticizer used to bond the filaments into a composite body. It will be understood, however, that this factor can be readily controlled, as desired, and thus is a relative constant in comparison with the variable parameters of the filamentary tow characteristics.

For the production of cigarette filters of optimum pressure drop and filtering characteristics, therefore, the present invention contemplates the provision of blends of filaments of either of the types shown in FIGS. 3 and 6 with other filaments of different cross-sectional shapes. To this end it is possible to employ specially constructed spinnerettes, as will now be explained more fully.

Referring first to FIG. 7, it will be seen that in accordance with one aspect of the present invention, the spinnerette 10b there shown is provided with respective pluralities of openings 17 and 18. The former may be, in terms of shape, arrangement and orientation, identical with the openings 11 of the spinnerette 10 shown in FIG. 1 or with the openings 11' of the spinnerette 10a shown in FIG. 4, while the openings 18 are circular. The arrangement of the jet openings in the spinnerette 10b is illustrated, by way of example, to be such that the notched or indented segmental openings 17 are disposed in alternating relationship with the circular openings 18. The openings 17, as in the case of the openings 11 or 11', give rise to filaments 15 or 16 having either the U or the "sigma" cross-section shown in FIGS. 3 and 6, while the circular openings 18 give rise to filaments 19 of bulbous cross-section. The resultant blends of filaments are illustrated diagrammatically in FIGS. 7a and 7b.

In accordance with another aspect of the present invention, the spinnerette 10c (FIG. 8) may be provided with notched or indented segmental openings 17 and square openings 20. Filaments through the latter have an essentially K or X cross-section. The blend of such K or X filaments 21 with the U filaments 15 is illustrated diagrammatically in FIG. 8a, and the blend of the K or X filaments with the "sigma" filaments 16 in 8b.

The spinnerette 10d in accordance with still another aspect of the present invention (see FIG. 9) is provided with a plurality of notched or indented segmental openings 17 and a plurality of triangular openings 22. The latter give rise to essentially Y shaped filaments and may be arranged in any desired manner with respect to the orientation of the apices of each triangle. The blend of the Y filaments 23 with the U filaments 15 is illustrated diagrammatically in FIG. 9a, and the blend of the Y filaments with the "sigma" filaments 16 in FIG. 9b.

With respect to the spinnerettes 10b, 10c and 10d it should be noted that, as in the case of the spinnerettes 10 and 10a, the jet openings which cannot be accommodated along a single circular locus may be arranged in a plurality of concentric circles or, if desired, in a plurality of parallel rows or tiers.

The lower pressure drop afforded by the filter tows composed of each of the blends of filaments shown in FIGS. 7a to 9b as compared with the relatively higher pressure drop afforded by a tow made solely of bulbous cross-section filaments or of K cross-section filaments or of Y cross-section filaments appears to be the result of the interlocking action of the various filaments. Thus due to the blending of these filaments of different cross sections, there appears to be less interlocking of the two different types of filaments in each blend than is encountered in a tow made of filaments of only one cross-section.

While in the drawings the differently shaped jet openings have been shown as exactly alternated with one another, the distribution need not be so regular. In addition, the numbers of openings of each shape may be different, i.e., any one shape may be present in number to the extent of about 30% to 100% of the number of another shape. It will furthermore be apparent that the various blends of filament cross-sections may be produced by combining bundles of U or "sigma" filaments extruded through the spinnerettes 10 or 10a with bundles of either bulbous or X(K) or Y cross-section filaments extruded through respective spinnerettes (not shown) having only circular or square or triangular jet openings formed therein.

The following examples will serve to illustrate the principles of the present invention more clearly.

EXAMPLE I

An acetone solution of secondary cellulose acetate, having an acetyl value of 55%, was extruded downwardly into a cabinet through a spinnerette provided with 35 notched segmental jet openings of the type illustrated in FIG. 1. For each opening, the hole diameter, i.e. the dimension $a$ in FIG. 2, was 80 microns, and the dimensions $d$ and $e$ of each notch were such as to make the area of each opening 2,320 square microns, i.e. 46.2% of the total area of the full circumscribed circle. The temperature in the spinning cabinet was 70° C. both at the spinnerette level and at the mid-cabinet level. The filaments were extracted from the cabinet at a feed roll speed of 508 meters per minute and at a drawdown ratio of 1.12. The resultant yarn had a denier of 144.6, a denier per filament of 4.1, a tenacity of 1.11 grams per denier, and an elongation at break of 25.0%. The yarn was characterized by a smooth, soft hand and by even dyeing. The filaments in cross-section were shaped as shown in FIG. 3 and were each characterized by a wall thickness of approximately 7 microns, a perimeter of about 150 microns, a cross-sectional area of about 380 square microns, and a perimeter to cross-sectional area ratio of about 0.39. Yarns made from such filaments are found to be especially suited for use in the manufacture of taffetas, antique satins, and other fabrics.

EXAMPLE II

An acetone solution of secondary cellulose acetate, having an acetyl value of 55%, was extruded downwardly into a cabinet through a spinnerette having 17 notched segmental jet openings of the type illustrated in FIG. 1. For each opening, the hole diameter (dimension $a$ in FIG. 2) was 70 microns, and the dimensions $d$ and $e$ for each notch were such as to make the area of each of the respective openings 1,857 square microns, i.e. 44.4% of the total area of the circumscribed circle. In the spinning cabinet the temperature was 72° C. at the spinnerette level and 70° C. at the mid-cabinet level. The filaments were extracted from the cabinet at a feed roll speed of 567 meters per minute and at a drawdown ratio of 0.96 and had the cross-sectional shape illustrated in FIG. 3 and the dimensional characteristics set forth in Example I. The resultant yarn had a denier of 70.1, a denier per filament of 4.1, a tenacity of 1.12 grams per denier, and an elongation at break of 24.5%. The hand, dyeability, cross-section and weaving characteristics, inter alia, of this yarn were substantially the same as those of the yarn of Example I.

EXAMPLE III

The same solution of cellulose acetate as used in Example I was extruded through a spinnerette having 35 notched segmental jet openings of the type shown in FIG. 4. The hole diameter (dimension $g$ in FIG. 5) was 70 microns, and the dimensions $f, h, i$ and $j$ for each opening were such as to make the area of the opening 2,290 square microns, i.e. 60% of the total area of the circumscribed circle. The filaments were extracted from the cabinet, in which the temperature at both jet level and mid-cabinet level was 70° C., at a feed roll speed of 508 meters per minute and at a drawdown ratio of 1.06, and each had a cross-sectional shape as shown in FIG. 6, with a wall thickness of about 7 microns, a perimeter of about 150 microns, a cross-sectional area of about 380 square microns, and a perimeter to cross-sectional area ratio of about 0.39. The resultant yarn had a denier of 144.6, a denier per filament of 4.1, a tenacity of 1.11 grams per denier, and an elongation at break of 25.3%.

EXAMPLE IV

A plain weave taffeta fabric having a thread count of 181 warp ends per inch and 58 picks per inch was formed from a warp comprising 75/17 cellulose acetate yarn of U cross-section, having a total twist of about 0.8 Z turns per inch, and produced as set forth in Example II, and a filling comprising 150/35 35 W cellulose acetate yarn of U cross-section, having a total twist of about 0.1 to 0.2 Z turns per inch, and produced as set forth in Example I. The weight of the fabric was 2.73 ounces per square yard, and the fabric was found to be of good quality in terms of "hand" or smoothness, fullness, dyeability, and resistance to shrinkage upon laundering.

EXAMPLE V

A 5-shaft satin (antique satin) fabric having a thread count of 180 warp ends per inch and 49 picks per inch was formed from a warp comprising 75/17 cellulose acetate yarn of U cross-section, having a total twist of about 0.8 Z turns per inch, and produced as set forth in Example II, and a filling comprising a pink single-ply rayon yarn having a cotton count of 840 yards/lb. The fabric was found to have good "hand" or feel and launderability characteristics.

It is to be understood that the foregoing detailed description of the invention is given merely by way of illustration, and that many variations may be made therein without departing from the spirit of our invention.

The embodiments of the invention in which an exclusive property or privilege is claimed are defined as follows:

1. A spinnerette having formed therein at least one jet opening the basic shape of which is a segment of a circle, the straight boundary wall of said jet opening being provided with a small protuberance extending toward the opposed curved boundary wall of said jet opening.

2. Spinnerette according to claim 1 wherein the said basic shape is a 50% segment of a circle, the diameter-defined straight boundary wall of said jet opening being provided with a centrally located small protuberance extending toward the opposed curved boundary wall of said jet opening.

3. Spinnerette according to claim 1 wherein the said basic shape is a greater than 50% segment of a circle, the chord-defined straight boundary wall of said jet opening being provided with an eccentrically located small protuberance extending toward the opposed curved boundary wall of said jet opening.

4. A spinnerette having formed therein a plurality of jet openings, at least some of said jet openings each having the basic shape of a segment of a circle, the straight boundary wall of each such segmental jet opening being provided with a small protuberance extending toward the opposed curved boundary wall of the same jet opening.

5. Spinnerette according to claim 4 wherein said basic shape is a 50% segment of a circle, the diameter-defined straight boundary wall of each such segmental jet opening being provided with a centrally located small protuberance extending toward the opposed curved boundary wall of the same jet opening.

6. A spinnerette according to claim 5, at least some of the remaining jet openings each being circular in shape.

7. A spinnerette according to claim 5, at least some of the remaining jet openings each being quadrilateral in shape.

8. A spinnerette according to claim 5, at least some of the remaining jet openings each being trilateral in shape.

9. Spinnerette according to claim 4 wherein said basic shape is a greater than 50% segment of a circle, the chord-defined straight boundary wall of each such segmental jet opening being provided with an eccentrically located small protuberance extending toward the opposed curved boundary wall of the same jet opening.

10. A spinnerette according to claim 9, at least some of the remaining jet openings each being circular in shape.

11. A spinnerette according to claim 9, at least some of the remaining jet openings each being quadrilateral in shape.

12. A spinnerette according to claim 9, at least some of the remaining jet openings each being trilateral in shape.

References Cited

UNITED STATES PATENTS

| | | | |
|---|---|---|---|
| 2,838,364 | 6/1958 | Smith | 264—177 |
| 2,945,739 | 7/1960 | Lehmicke | 18—8 X |
| 3,178,770 | 4/1965 | Willis | 264—177 X |
| 3,187,607 | 6/1965 | Krummeck | 18—8 X |

FOREIGN PATENTS

| | | |
|---|---|---|
| 1,278,970 | 1960 | France. |
| 253,209 | 1926 | Great Britain. |
| 545,118 | 1942 | Great Britain. |
| 843,179 | 1960 | Great Britain. |
| 891,464 | 1962 | Great Britain. |

ALEXANDER H. BRODMERKEL, *Primary Examiner.*

J. H. WOO, *Assistant Examiner.*